United States Patent
Perumalla et al.

(10) Patent No.: US 12,307,890 B2
(45) Date of Patent: May 20, 2025

(54) BRAIN-COMPUTER INTERFACE ENABLED COMMUNICATION BETWEEN AUTONOMOUS VEHICLES AND PEDESTRIANS

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Mahesh Malatesh Chitragar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 17/823,759

(22) Filed: Aug. 31, 2022

(65) Prior Publication Data
US 2024/0071220 A1 Feb. 29, 2024

(51) Int. Cl.
*G08G 1/0967* (2006.01)
*B60W 50/14* (2020.01)
(Continued)

(52) U.S. Cl.
CPC ....... *G08G 1/096716* (2013.01); *B60W 50/14* (2013.01); *B60W 60/0015* (2020.02);
(Continued)

(58) Field of Classification Search
CPC ...... G08G 1/096716; G08G 1/096783; B60W 50/14; B60W 60/0015; B60W 2050/146;
(Continued)

(56) References Cited

U.S. PATENT DOCUMENTS 9,881,503 B1 * 1/2018 Goldman-Shenhar ....................... B60Q 5/006
9,947,215 B2 4/2018 Di Censo
(Continued)

FOREIGN PATENT DOCUMENTS

CN 109375776 B * 7/2021 ............. G06F 3/015

OTHER PUBLICATIONS

CN109375776B_Machine Translation (Year: 2021).*
(Continued)

*Primary Examiner* — Jelani A Smith
*Assistant Examiner* — Alyssa Rorie
(74) *Attorney, Agent, or Firm* — Kimberly Zillig

(57) ABSTRACT

Systems, methods and/or computer program products for improving autonomous vehicle operation by enabling communication between the autonomous vehicles and BCI systems publishing signals from nearby pedestrians. Wearable BCI devices worn by pedestrians analyze brainwave signals and classify the brainwave signals in order to filter out signals that are unrelated to crossing the street or the directionality of travel by the pedestrian. BCI devices publish, or broadcast brain wave signals related to crossing the street or directionality of travel to the surrounding area where autonomous vehicle receive and process the brainwave signals being published. The autonomous vehicles predict movements of nearby pedestrians based on the intended direction of travel signified by the collected brainwave signals, and the autonomous vehicles select driving actions in response to the anticipated movements of nearby pedestrians.

20 Claims, 7 Drawing Sheets

(51) Int. Cl.
  *B60W 60/00*  (2020.01)
  *G06F 3/01*  (2006.01)
(52) U.S. Cl.
  CPC ....... *G06F 3/015* (2013.01); *G08G 1/096783* (2013.01); *B60W 2050/146* (2013.01); *B60W 2554/4029* (2020.02); *B60W 2554/4041* (2020.02); *B60W 2554/4043* (2020.02); *B60W 2554/4044* (2020.02); *B60W 2554/4045* (2020.02); *B60W 2556/45* (2020.02)
(58) Field of Classification Search
  CPC . B60W 2554/4029; B60W 2554/4041; B60W 2554/4043; B60W 2554/4044; B60W 2554/4045; B60W 2556/45; B60W 30/0956; B60W 60/0017; B60W 2554/4042; B60W 2756/10; G06F 3/015
  See application file for complete search history.

(56) References Cited

U.S. PATENT DOCUMENTS

| | | | | |
|---|---|---|---|---|
| 2013/0096453 | A1* | 4/2013 | Chung | G06F 3/015 600/544 |
| 2014/0330404 | A1* | 11/2014 | Abdelghani | A61B 5/4851 700/83 |
| 2017/0345292 | A1* | 11/2017 | Haran | G08G 1/166 |
| 2018/0096605 | A1* | 4/2018 | Bai | B60Q 1/525 |
| 2020/0180647 | A1 | 6/2020 | Anthony | |
| 2021/0078598 | A1* | 3/2021 | Kim | B60K 35/22 |
| 2021/0233406 | A1* | 7/2021 | Lu | G08G 1/161 |
| 2021/0394705 | A1 | 12/2021 | Kourous-Harrigan | |

OTHER PUBLICATIONS

M. K. Ishak and M. Dyson, "Human movement intentions based on EEG using brain computer interfaces," 2015 International Conference on Control, Electronics, Renewable Energy and Communications (ICCEREC), Bandung, Indonesia, 2015, pp. 58-62, doi: 10.1109/ICCEREC.2015.7337054. (Year: 2015).*

Bellan, Rebecca, "NHTSA probes Tesla Autopilot crash that killed three people", TechCrunch, May 18, 2022, 11 pages, <https://techcrunch.com/2022/05/18/nhtsa-probes-tesla-autopilot-crash-that-killed-three-people/>.

Parikh et al., "Conceptual Neuroadaptive Brain Computer Interface for Autonomous Control of Automobile Brakes", 2020 11th IEEE Annual Ubiquitous Computing, Electronics & Mobile Communication Conference (UEMCON), pp. 0958-0961.

Waytowich, Nicholas, "BCI Control of a Motorized Wheelchair for Disabled Individuals using a calibrationless SSVEP system", YouTube, Nov. 20, 2014, 3 pages, <https://www.youtube.com/watch?v=qhK572LJhSc>.

* cited by examiner

BRAIN-COMPUTER INTERFACE ENABLED COMMUNICATION BETWEEN AUTONOMOUS VEHICLES AND PEDESTRIANS

BACKGROUND

The present disclosure relates generally to the field of brain-computer interfaces and autonomous vehicles, and more specifically, autonomous vehicles receiving and using brain-computer interface signals generated by nearby pedestrians to make driving decisions and engage in driving maneuvers.

An autonomous vehicle (otherwise known as a driverless vehicle), is a vehicle that is able to operate itself or perform driving functions without human intervention using the vehicle's ability to sense the surrounding environment. Autonomous vehicles can utilize a fully automated driving system in order to respond to external conditions outside of the vehicle that a human would normally manage and navigate while piloting a vehicle. The level of autonomy of autonomous vehicles may be described by one of six levels. At level 0, the vehicle does not control its operations and humans control all of the driving operations. At level 1, a vehicle's advanced driver assistance system (ADAS) can support the human driver by assisting with steering, accelerating and/or braking. At level 2, a vehicle's ADAS can oversee steering, accelerating and braking in certain condition, but a human driver is required to pay complete attention to the vehicle and driving environment throughout operation of the vehicle. At level 3 an advanced driving system (ADS) may be operational within the vehicle, performing all driving tasks in some conditions, however a human driver can be required to regain control over the vehicle when requested by the vehicle's ADS. At level 4 the vehicle's ADS performs all driving tasks independently in certain conditions while human attention is not required. Lastly, at level 5 the vehicle is fully automated whereby the vehicle's ADS is able to perform all tasks in all conditions without any driving assistance from a human operator.

A brain-computer interface (BCI) refers to technology that can send and receive signals between the brain and external devices. BCIs collect and interpret brain signals and then transmits the interpreted signal to a connected machine. The machine connected to the BCI outputs commands associated with the brain signals being received.

SUMMARY

Embodiments of the present disclosure relate to a computer-implemented method, an associated computer system and computer program products for enabling communication between an autonomous vehicle and a nearby pedestrian, improving autonomous vehicle operation in response to signals outputted by brain-computer interfaces of the nearby pedestrians. The computer-implemented method comprises: receiving, by a processor of a brain-communication interface (BCI) device, brainwave signals generated by the nearby pedestrian; classifying, by the processor, the brainwave signals; identifying, by the processor, the brainwave signals that are classified as relating to movement of the nearby pedestrian; filtering, by the processor, the brainwave signals unrelated to the movement of the nearby pedestrian; broadcasting the brainwave signals classified as relating to the movement of the nearby pedestrian to the autonomous vehicle; and in response to broadcasting the brainwave signals classified as relating to the movement of the nearby pedestrian, displaying, by the processor, one or more driver actions being implemented by the autonomous vehicle to the nearby pedestrian.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
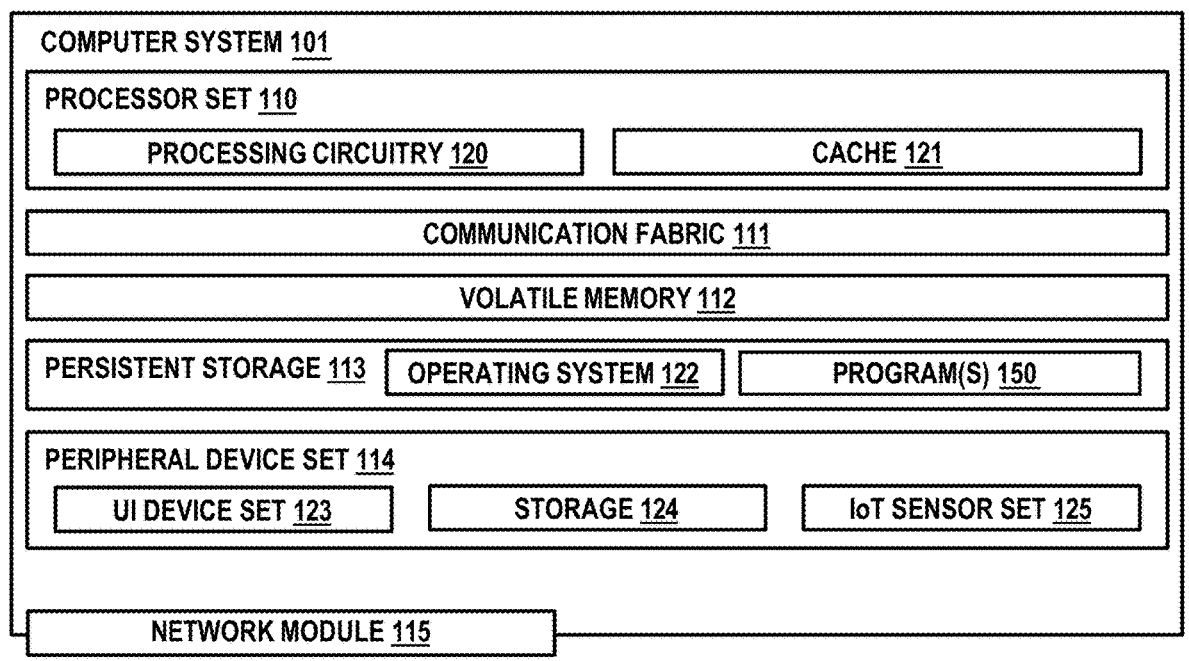
FIG. 1 depicts a block diagram illustrating an embodiment of a computer system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Embodiments of the present disclosure recognize that precise, seamless communications between autonomous vehicles and pedestrians can improve the flow of traffic and increase the safety on the roadways for both vehicles and pedestrians. If nearby pedestrians can communicate their intentions as they navigate past, alongside or in front of autonomous vehicles, the autonomous vehicle can proactively make driving decisions and account for expected parameters of the road conditions, including the presence of pedestrians moving in front of the vehicle. Overall, reducing accidents while being able to alert pedestrians when crossing in front of the vehicles should be considered safe. Therefore, there is a need for enabling communications between nearby pedestrians and autonomous vehicles that can include communication of a pedestrian's intended movements that could impact driving decisions made by autonomous vehicles.

Embodiments of the present disclosure improve vehicle navigation and safety of pedestrians near autonomous vehicles by enabling communications between one or more nearby pedestrians and the autonomous vehicles using brain-computer interface (BCI) devices. Wearable BCI devices equipped by pedestrians can analyze brainwave signals and classify the brainwave signals in order to filter out signals that are unrelated to crossing the street or the directionality of travel by the pedestrian. BCI devices may publish, or broadcast brain wave signals related to crossing the street and/or directionality of travel by a pedestrian within the surrounding area where an autonomous vehicle can receive and process the brainwave signals being published. The autonomous vehicles may predict movements of nearby pedestrians based on the intended movements and/or direction of travel signified by the collected brainwave signals, causing the autonomous vehicles to select driving actions based on the anticipated movements of nearby pedestrians, and adjust driving parameters. These driving actions can include changing lanes, reducing speed, stopping the vehicle, not stopping the vehicle, etc.

In some embodiments, autonomous vehicles can communicate the intended driving actions back to the nearby pedestrians. For example, autonomous vehicle decisions may be communicated back to the pedestrian by displaying or previewing the vehicle's intended action on an augmented reality (AR) device in the possession of the pedestrian. The pedestrian using the AR device can see the intended driving action of the autonomous vehicle before the driving action is implemented. The pedestrian can choose to respond to the known upcoming intended action of the autonomous vehicle accordingly. For instance, if the AR device displays the autonomous vehicle will be stopping to allow the pedestrian to cross, the user can proceed with crossing the street knowing the autonomous vehicle will be stopping. In some instances, traffic signals such as streetlights and crossing signals may sync up with the actions selected by the autonomous vehicles. For example, if an autonomous vehicle is communicating that the vehicle will be stopping to allow a pedestrian to cross, the traffic signal can receive the data from the autonomous vehicle and change the lights while a crossing signal can be adjusted to indicate to the pedestrian to cross the road. Autonomous vehicles can also engage in vehicle-to-vehicle communication, allowing multiple autonomous vehicles to coordinate actions based on the brain signals received from one or more BCI devices. For example, if an autonomous vehicle is indicating that the vehicle will be stopping to allow a pedestrian to cross, the optimal action for a second autonomous vehicle (which could be behind the first vehicle or may be oncoming from the opposite direction), may also stop and allow the pedestrian to cross.

Embodiments of the present disclosure recognize that not all pedestrians traveling near autonomous vehicles may be equipped with a BCI device. In such a situation where a pedestrian is not equipped with a BCI device, nearby pedestrians equipped with BCI devices may observe and predict actions of the nearby pedestrians lacking the BCI hardware. The pedestrian equipped with the BCI device can broadcast brainwave signals predicting the action of the other nearby pedestrian. For example, while the pedestrian equipped with the BCI device may not be intending to cross the street, however the pedestrian with the BCI device may predict that another pedestrian without a BCI device may cross the street. The prediction for the pedestrian lacking the BCI device can be broadcasted by the BCI device of the pedestrian (along with the signals indicating the pedestrian's own actions) to nearby autonomous vehicles. Autonomous vehicles receiving signals about the pedestrian lacking a BCI device can be considered by the vehicle as the autonomous vehicle selects one or more driving actions in light of the signals being received about both nearby pedestrians that are equipped with a BCI device and those that are not equipped with a BCI device.

Computing System

Various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

FIG. 1 illustrates a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computer system 101 may take the form of a desktop computer, laptop computer, tablet computer, smart phone, smart watch or other wearable computer, mainframe computer, quantum computer or any other form of computer or mobile device now known or to be developed in the future that is capable of running a program 150, accessing a network or querying a database, such as remote database 130. Performance of a computer-implemented method executed by a computer system 101 may be distributed among multiple computers and/or between multiple locations. Computer system 101 may be located as part of a cloud network, even though it is not shown within a cloud in FIGS. 1-2. Moreover, computer system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Computer readable program instructions can be loaded onto computer system 101 to cause a series of operational steps to be performed by processor set 110 of computer system 101 and thereby effect a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as program(s) 150, application(s), processes, services, and installed components thereof. For example, program instructions, processes, services and installed components thereof may include BCI module 203 and/or driving module 211 as shown in more detail in FIGS. 3B and 3C.

Communication fabric 111 may refer to signal conduction paths that may allow the various components of computer system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computer system 101, the volatile memory 112 is located in a single package and can be internal to computer system 101, but, alternatively or additionally, the volatile memory 112 may be distributed over multiple packages and/or located externally with respect to computer system 101. Program(s) 150, application(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computer system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computer system 101. For example, via an input/output (I/O interface). Data communication connections between the peripheral devices and the other components of computer system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet of Things applications. For example, a sensor may be a temperature sensor, motion sensor, infrared sensor or any other type of known sensor type.

Network module 115 may include a collection of computer software, hardware, and firmware that allows computer system 101 to communicate with other computers through a computer network, such as WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computer system 101 from an external computer or external storage device through a network adapter card or network interface included in network module 115.

Figure 2:
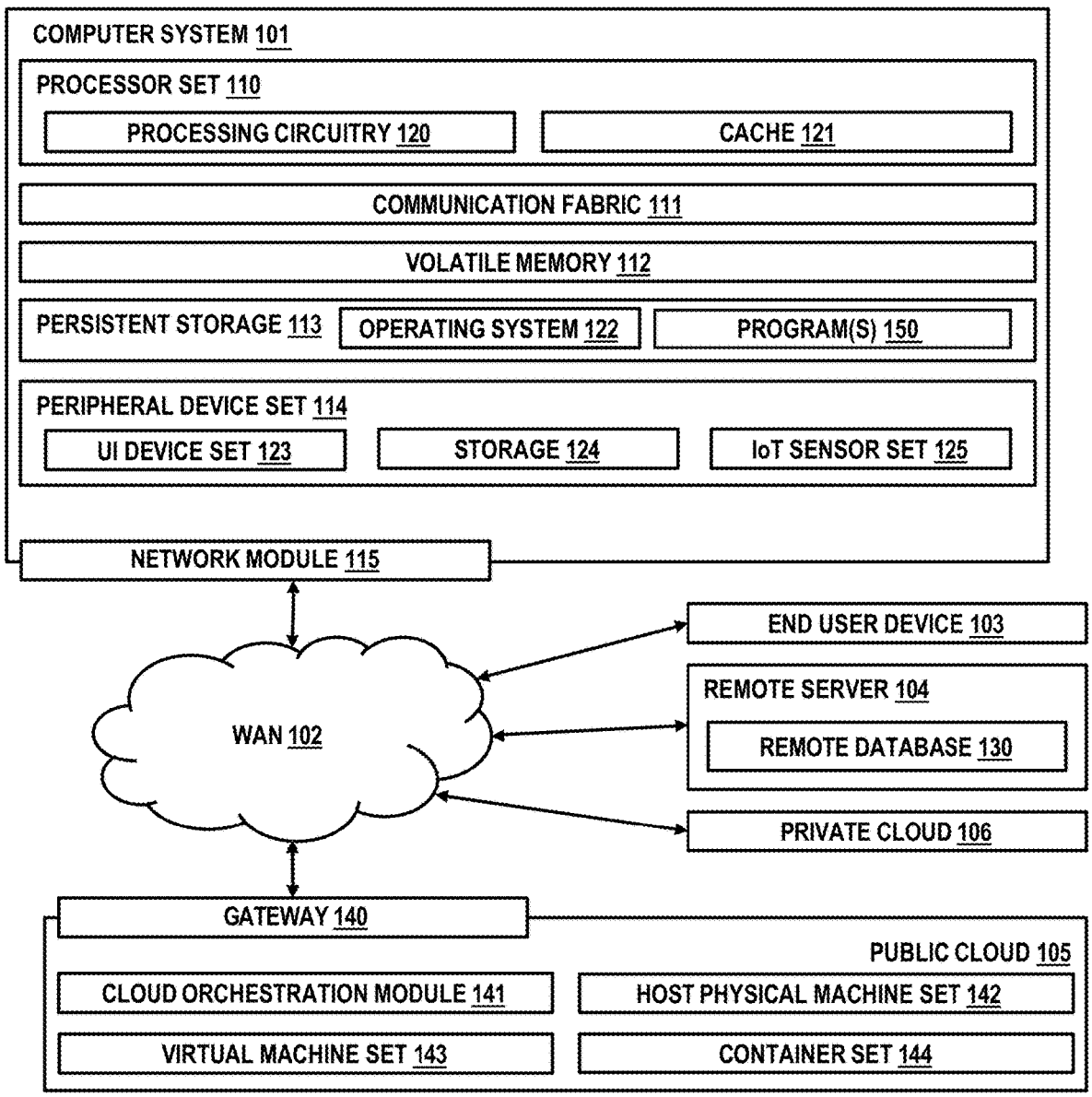
FIG. 2 depicts a block diagram illustrating an extension of the computing system environment of FIG. 1, wherein the computer systems are configured to operate in a network environment and perform methods described herein in accordance with the present disclosure.

FIG. 2 depicts a computing environment 200 which may be an extension of the computing environment of FIG. 1, operating in a networked environment. In addition to computing system 101, computing environment 200 can include wide area network (WAN) 102 (or another type of computer network) connecting to an end user device (EUD) 103, remote server 104, public cloud 105, and/or private cloud 106. In this embodiment, computer system 101 includes processor set 110 (including processing circuitry 120 and cache 121), communication fabric 111, volatile memory 112, persistent storage 113 (including operating system 122 and program(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

WAN 102 may be described as any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs may be comprised of wired or wireless connections. For example, connections may be comprised of computer hardware such as copper transmission cables, optical transmission fibers, wireless transmission, routers, firewalls, switches, gateway computers and/or edge servers. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computer system 101) and may take any of the forms discussed above in connection with computer system 101. EUD 103 may receive helpful and useful data from the operations of computer system 101. For example, in a hypothetical case where computer system 101 is designed to provide a recommendation to an end user, this recommendation may be communicated from network module 115 of computer system 101 through WAN 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computer system 101. Remote server 104 may be controlled and used by the same entity that operates computer system 101. Remote server 104 represents the machine(s) that collect and store helpful and useful data for use by other computers, such as computer system 101. For example, in a hypothetical case where computer system 101 is designed and programmed to provide a recommendation based on historical data, the historical data may be provided to computer system 101 from remote database 130 of remote server 104.

Public cloud 105 may be any computing systems available for use by multiple entities that provides on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of programs 150 running in them. A computer program 150 running on an operating system 122 can utilize all resources of that computer, such as connected devices, files and folders, network shares, CPU power, and quantifiable hardware capabilities. Programs 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with WAN 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

System for Improving Autonomous Vehicle Operation Using Signals Outputted by Brain-Computer Interface System of Nearby Pedestrians It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 3A:
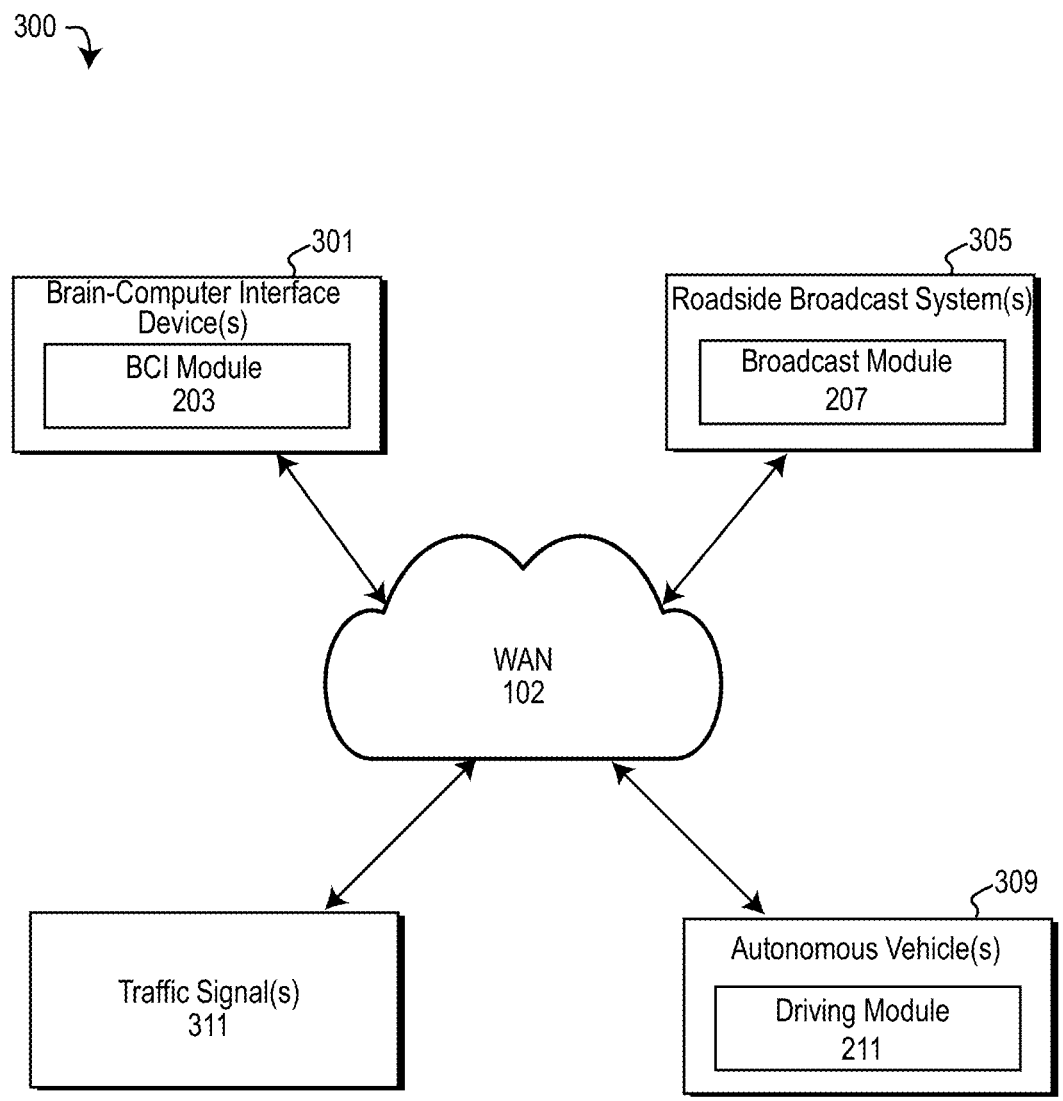
FIG. 3A depicts a functional block diagram describing an embodiment of a computing environment for facilitating communication between autonomous vehicle(s), BCI device(s), and/or smart road infrastructure connected via a computer network.

Referring to the drawings, FIG. 3A depicts an embodiment of a computing environment 300 illustrating systems enabling pedestrians operating a brain-computer interface device 301 (hereinafter BCI device 301) to communicate intended movements of the pedestrian via a brainwave signals to nearby autonomous vehicle(s) 309, allowing the autonomous vehicle(s) 309 to take into consideration the intended movements of the pedestrian during the vehicle's driving operations and adjust driving parameters in response thereto. As illustrated, the computing environment 300 may comprise one or more BCI device(s) 301, autonomous vehicle(s) 309, roadside broadcast system(s) 305 and/or traffic signal(s) 311 (or other types of traffic controlling infrastructure) placed in communication with one another via a computing network such as WAN 102. Brainwave signal data collected by the BCI device 301 along with other types of data describing the pedestrian (such as travel speed, direction, location, etc.) can be published directly by the BCI device 301 to the surrounding area and/or published using nearby roadside broadcast systems 305 or other types of smart roadway systems positioned along or near roadways. The roadside broadcast system 305 may be equipped with broadcast module 207 comprising a transmitter, receiver and/or transceiver, along with installable components enabling receipt of the brainwave signal data and other types of data collected by the BCI device 301. Roadside broadcast system 305 can enable the transmission of the brainwave signals and/or other types of data to the surrounding area, allowing autonomous vehicles 309 to receive and process the collected data.

Brainwave signals and other types of data broadcasted by the BCI device 301 and/or roadside broadcast system 305 can be processed by the computing systems, programs, applications, services or other types of software being executed by autonomous vehicles 309 to assist with decision-making processes performed by the vehicle, including one or more driving actions employed by the vehicle in response the brainwave signal data. The autonomous vehicle (s) 309 making decisions using the brainwave signal data can communicate one or more driving actions back to the pedestrian in the form of notifications and/or animated visualization of the driving action to be displayed to the pedestrian. For example, as a video clip, one or more images, a notification, and/or as an augmented reality display describing the intended driving path or maneuvers that will be taken by the autonomous vehicle 309 in response to the nearby pedestrians' intended actions provided to the autonomous vehicle 309. In some embodiments driving actions and maneuvers being performed by the autonomous vehicle 309 can also be broadcasted to nearby roadway infrastructure such as traffic signals 311. For instance, in a situation where brainwave signals provided by a pedestrian wearing a BCI device 301 indicates that the pedestrian intends to cross a roadway in front of oncoming autonomous vehicle 309, the autonomous vehicle 309 may communicate a driving action that indicates the autonomous vehicle 309 is stopping before reaching the pedestrian and may send such driving action to a traffic signal. In response to receiving the autonomous vehicle's driving action indicating stopping the vehicle, the traffic signal 311 may turn red in anticipation of the autonomous vehicle 309 stopping.

Figure 3B:
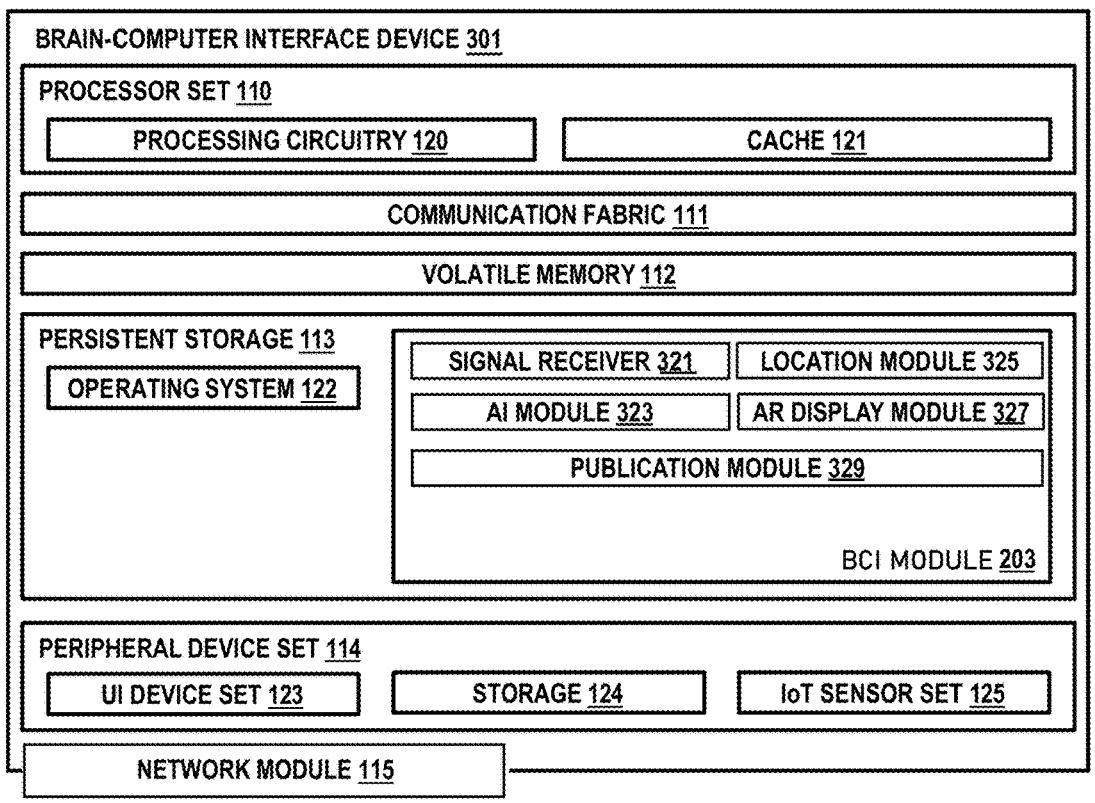
FIG. 3B depicts an embodiment of a BCI device executing program code enabling communication between the BCI device and an autonomous vehicle, including one or more features and functions of the BCI device published for receipt by the autonomous vehicle, in accordance with the present disclosure.

Embodiments of the BCI device 301 may include a BCI module 203, which may be responsible for performing functions, tasks and processes of the BCI device 301 related to receiving brainwave signals from a user, classifying the signals, filtering out signals unrelated to the user's movements, identifying and providing location information as well as movement speeds and timing information, publishing brainwave signals and/or other types of data about the user or other nearby pedestrians and displaying communications received from nearby autonomous vehicles 309. The term "module" may refer to a hardware module, software module, or a module may be a combination of hardware and software resources. A module (whether hardware, software or a combination thereof) may be designed to implement or execute one or more specific tasks, routines and/or functions. Embodiments of hardware-based modules may include self-contained components such as chipsets, specialized circuitry, processor sets 110, one or more volatile memory 112 devices and/or persistent storage 113. A software-based module may be part of a program 150, program code or linked to program code comprising a set of specific programmed instructions loaded into a volatile memory 112 or persistent storage 113 of BCI device 301. As shown in FIG. 3B, embodiments of the BCI module 203 may include one or more sub-modules and/or components that may perform one or more of the specific tasks, processes or functions of the BCI module 203. For example, in the exemplary embodiment of BCI module 203, the BCI module 203 may include a signal receiver 321, AI module 323, location module 325, AR display module 327 and/or publication module 329.

Signal receiver 321 performs functions, tasks and processes of BCI module 203 associated with acquisition and measurement of signals being sent by the brain and/or central nervous system (CNS) of the user of the BCI device 301. Any type of brain signals can be used and acquired by BCI device 301. For example, signal receiver 321 can collect electrical signals produced by neuronal postsynaptic membrane polarity changes, which may occur due to the activation of voltage gated channels or ion-gated channels within the user's body. These electrical signals can be measured in a manner similar to the mechanism employed by electroencephalogram (EEG). However, an EEG alone should not be considered a BCI device 301 since it only records the brain signals and does not generate an output that acts on the user's surrounding environment. Signal receiver 321 may measure signals at any point where the BCI device 301 may contact the skin or the surface of the user. For example, BCI device 301 may be a head mounted cap, glasses, earbuds etc. and may acquire or record measurements of brainwave signals along the scalp of the user or exterior position of the user where signal may be traversing the user. In some embodiments, signal receiver 321 may acquire brain signals using a grid or strip of electrodes on the cortical surface of the user. In other embodiments, the BCI device 301 may be an implantable device wherein the signal receiver 321 may comprise electrode arrays recording large areas of the user's brain intracranially. Embodiments of BCI device 301 may include advanced types of signal receivers 321. For example, embodiments of signal receiver 321 may acquire brainwave signals using magnetoencephalography (MEG) to measure magnetic fields generated by electrical currents moving along pyramidal cell axons of the user. MEG measurements of the magnetic field may measure the mu rhythm of the user and/or modulation of the posterior alpha rhythm of the user. In alternative embodiments, signal receiver 321 may utilize functional magnetic resonance imaging (fMRI) and/or functional near-infrared imaging (fNIR) to measure the blood oxygenation of a cerebral region of the user and correlate the measurements with neural activity of the user.

Embodiments of signal receiver 321 may implement pre-processing of the raw brainwave signals prior to further processing that may be conducted by AI module 323 of the BCI module 203. For example, embodiments of signal receiver 321 may amplify the collected brainwave signals to a level that may be suitable for electronic processing. Signal receiver 321 may subject the raw brainwave signals to filtering in order to remove electrical noise and undesirable characteristics. Signal receiver 321 may digitize the amplified and/or filtered raw brainwave signals into a computer-readable format capable of being processed by the BCI module 203 or another type of computing system. Signal receiver 321 may transmit or make the digitized brainwave signals accessible to AI module 323 for further processing.

Embodiments of AI module 323 may perform functions, tasks and/or processes of the BCI module 203 associated with performing feature extraction, classification and filtering of the digitized brainwave signals. Feature extraction may be described as the process of analyzing the digitized brainwave signals in order to distinguish pertinent signal characteristics (i.e., signal features relating to a person's intent and/or emotions) from extraneous content and representing the analyzed signals in a compact form that may be suitable for translation into an output capable of being received and/or understood by autonomous vehicles 309. Since much of the relevant (i.e., most strongly correlated) brain activity is either transient or oscillatory, the most commonly extracted signal features in current BCI systems are time-triggered EEG or ECoG response amplitudes and latencies, power within specific EEG or ECoG frequency bands, or firing rates of individual cortical neurons. Environmental artifacts and physiologic artifacts such as electromyographic signals can be avoided or removed to ensure accurate measurement of the brain signal features.

Features extracted by the AI module 323 can be compared against historically collected brainwave signals stored as part of a knowledge corpus. Extracted features can be classified using the knowledge corpus in order to identify brainwave signals corresponding to intended movements or emotions that may indicate intended movements. Extracted features having strong correlations with a user's intent, when compared with the knowledge corpus, can be classified by the AI module 323 using the existing knowledge corpus in order to distinguish whether the intent of the brainwave signal being analyzed is directed toward the movement of the user and/or a prediction of movement of another nearby pedestrian. For example, brainwave signals indicating the user or nearby pedestrian indicating an intent to cross the road, move in a certain direction and/or stop movement. Brainwave signals that are classified as being unrelated to the intended movements of the user and/or predicted movements of nearby pedestrians, can be filtered out of the data set being analyzed by the AI module 323, ensuring that brainwave signal data that is un-related to the movements of the nearby pedestrians or the user are not broadcasted to the surrounding environment by the BCI device 301. The processed brainwave signal data that is classified by the AI module 323 as being related to intended movements can be provided to the publication module 329 and broadcasted to the surrounding environment as described herein.

Embodiments of location module 325 may perform functions, tasks and/or processes of the BCI module 203 responsible for collecting and sharing location data of the user. For example, GPS location data describing the position of a user's BCI device 301, along with time stamp data indicating when the location data was collected by the location module 325. Location data collected by the location module 325 can be provided to the publication module 329 and broadcasted to the autonomous vehicle(s) 309 within the surrounding area. Location data, along with time stamp data, being provided to the nearby autonomous vehicles 309 can help the vehicles pinpoint the user's position relative to the autonomous vehicle 309 traveling along the roadway, and determine the direction a user may be traveling, as well as how fast the user may be traveling. In some embodiments, the location module 325 of the BCI device 301 may be equipped with an accelerometer. The accelerometer may measure and share movement speed data with the autonomous vehicles 309. Movement speed of the user may indicate to the autonomous vehicle 309 whether the user is walking, running, jogging, bicycling or using some other mode of manual or powered transportation and may impact the decision-making process of the autonomous vehicle 309 while selecting a driving action. Movement speed recorded by the accelerometer of the location module 325 may also be reported to the publication module 329 alongside the time stamp data and/or location data being collected.

Publication module 329 of the BCI module 203 may perform the functions, tasks or processes of the BCI device 301 directed toward broadcasting and sharing the brainwave signal data, location data, time stamp data, emotion data and/or movement speed data (collectively referred to herein as the "published data") of the pedestrians or user with the surrounding environment. The published data being broadcasted by the publication module 329 may be directly receivable by one or more nearby autonomous vehicles 309 positioned within a predetermined broadcast range of the BCI device 301 sharing the published data in some embodiments. In other embodiments, the publication module 329 may share the published data with smart road infrastructure capable of broadcasting the published data to nearby autonomous vehicles 309. In some instances, a BCI device 301 transmitting published data may have a shorter broadcasting range than smart road infrastructure which can be built with stronger antennas for transmitting the published data further. For example, the transmitter or transceiver of a publication module 329 may broadcast the published data to one or more nearby roadside broadcasting system 305. In response to receiving the published data, the roadside broadcasting system(s) 305 may be capable of amplifying the broadcasting transmission range and increase the number of autonomous vehicles 309 that may be able to receive the published data from further away than the BCI device 301 may be able to broadcast the published data on its own.

Embodiments of the BCI module 203 may include an AR display module 327. The AR display module 327 may receive and display images, text, notifications, video and other types of visual elements to the user of the BCI device 301 via a display device of a UI device set 123. In the exemplary embodiment of the BCI device 301, AR display module 327 can receive and display visual elements (such as animations of the autonomous vehicle 309) depicting a preview of one or more upcoming driving actions intended to be performed by nearby autonomous vehicles 309. For example, the user of the BCI device 301 may view a visual animation displaying the oncoming autonomous vehicle stopping at a crosswalk, allowing the user to cross the road. The AR display module 327 may render and/or display the visual elements being provided by the autonomous vehicles 309 in an augmented reality format, allowing the user to see the intended or upcoming driving actions superimposed over the surrounding physical environment. For example, if an autonomous vehicle 309 has communicated to the BCI device 301 that the autonomous vehicle 309 is stopping at the cross walk, a digital representation of the vehicle may be superimposed over the roadway and shown to be stopping at the crosswalk. Likewise, if the autonomous vehicle 309 is changing lanes, or intends to continue past the user of the BCI device 301 without stopping, the AR display module 327 may depict visual elements depicting the lane change and/or the continued movement of the autonomous vehicle 309 through the crosswalk without stopping. Moreover, if the user may be presented with a danger due to the driving actions selected by the autonomous vehicle 309, the AR display module 327 may select visual elements that may effectively communicate the potential dangers of the user proceeding with an intended movement. For example, AR display module 327 may use bright colors, enlarged text, display warnings, play sounds or alerts, etc. to obtain the attention of the user and indicate that performing the intended action may result in injury, such as being impacted by the autonomous vehicle 309 that does not intend to stop and allow the user to cross the roadway.

Figure 3C:
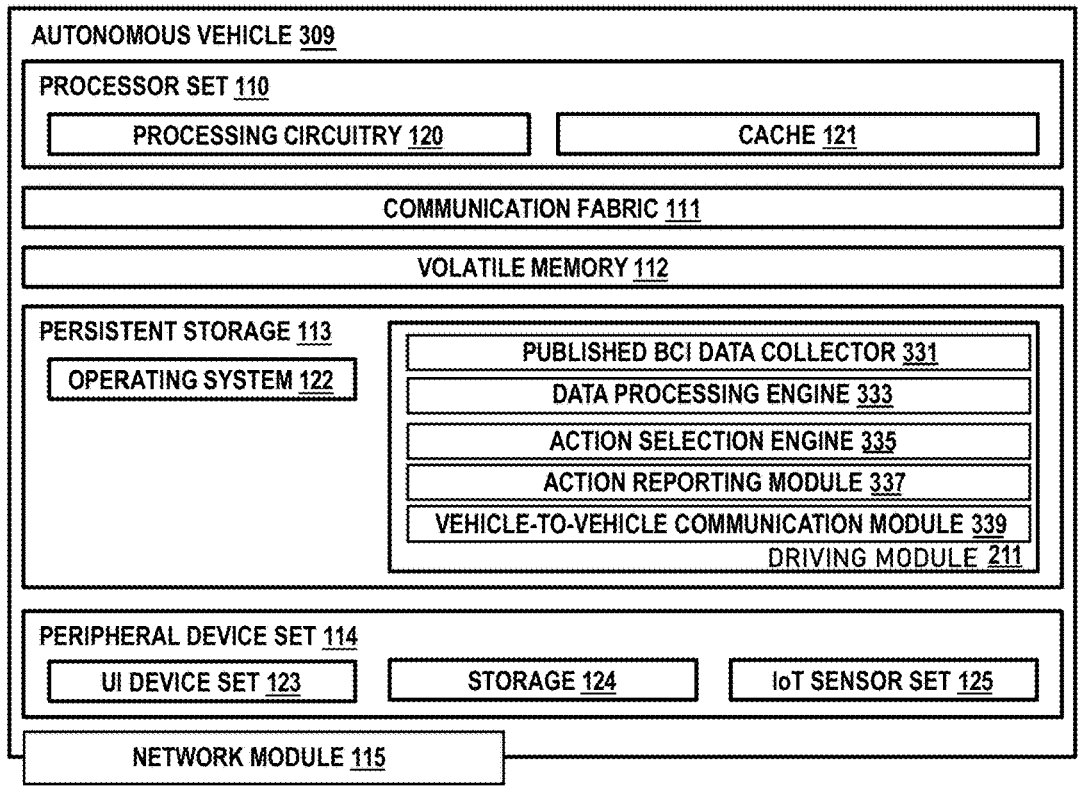
FIG. 3C depicts an embodiment of an autonomous vehicle executing program code enabling communication between a BCI and the autonomous vehicle, including one or more features and functions of the autonomous vehicle receiving published data received from a BCI device, in accordance with the present disclosure.

FIG. 3C illustrates a block diagram depicting an example of an autonomous vehicle 309 comprising a driving module 211 capable of receiving published data provided by nearby BCI devices 301 and/or smart roadway infrastructure and may communicate driving actions of the autonomous vehicle 309 back to the BCI device 301. Embodiments of autonomous vehicles 309 may include a driving module 211, which may be responsible for performing one or more tasks, functions and/or processes of the autonomous vehicle 309 related to retrieving published brainwave signal data or other types of data being published by pedestrians, including location data, timing data, movement speed data etc. Driving module 211 may further perform functions, tasks or processes directed toward processing the collected brainwave signal data and the other types of data being published in order to identify: intended pedestrian movements in relation to the location of the autonomous vehicle 309; impact of the intended pedestrian movements on the autonomous vehicle's current trajectory of travel under the current driving parameters; and a best course of action to take in response to the anticipated movements of nearby pedestrians. Moreover, the driving module 211 selects one or more driving actions to implement, broadcasts the one or more driving actions being taken by the autonomous vehicle 309 to nearby pedestrians, traffic signals 311 and/or other smart roadway infrastructure as well as communicate vehicle-to-vehicle with other nearby autonomous vehicles 309 in order to coordinate optimal driving actions on the roadway in view of the intended movement behavior of the nearby pedestrians. As shown in FIG. 3C driving module 211 can include additional sub-modules and/or components such as published BCI data collector 331, data processing engine 333, action selection engine 335, action reporting module 337 and vehicle-to-vehicle communication module 339.

Embodiments of a published BCI data collector 331 may perform tasks, functions and/or processes of the driving module 211 responsible for scanning the nearby area for published data being broadcasted by nearby BCI devices 301 and/or smart roadway technology, such as a roadside broadcast system 305. The published BCI data collector 331 retrieves the published data being broadcasted, including brainwave signal data, time stamps, location data and/or movement speed data, and may input the retrieved published data into a data processing engine 333. In some embodiments, the published BCI data collector 331 may filter out or removed one or more portions of the published data from a dataset of collected published data. For example, published BCI data collector 331 may filter and remove published data which may include BCI devices 301 broadcasting location data indicating the presence of a user or pedestrian that is not positioned along the traveling route of the autonomous vehicle 309 or may be positioned a distance from the autonomous vehicle 309 that is beyond a threshold distance for the autonomous vehicle 309 to consider when considering a series of upcoming driving actions.

Embodiments of data processing engine 333 may perform tasks, functions and/or processes of the driving module 211 associated with reviewing, and labeling the published data of each BCI device 301, as well as training or retraining decision models of the autonomous vehicle 309 based on the published data being received, in order to make optimal driving decisions in view of the published data being processed by the data processing engine 333, the surrounding pedestrians and/or other autonomous vehicles 309. The published data provided by BCI device 301 to the autonomous vehicle 309 can include brainwave signal data describing intended movements of the user of the BCI device 301, predicted movements of nearby pedestrians (that may not be equipped with a BCI device 301) that may be observable by users of a BCI device 301, the location of the BCI device's user and nearby pedestrians, movement speed and time stamps describing a time period the location data and movement data was collected by the BCI device 301. Data processing engine 333 may analyze the published data, identify a location area or range of locations where the pedestrians (including both BCI device users and non-device users) will move from their current location. Data processing engine 333 can predict a movement path for each of the corresponding pedestrians and/or BCI device users positioned along or near the autonomous vehicle's path of travel.

In some embodiments of the driving module 211, the data processing engine 333 may aggregate brainwave signal data, movement data, location data, and other elements of the published data broadcasted by multiple BCI devices 301 near the autonomous vehicle 309. Data processing engine 333 may use the published data to calculate an area along the roadway wherein the autonomous vehicle expects there will be mobile pedestrians actively moving across the roadway (referred to herein as a "mobility area") over a calculated period of time. Data processing engine 333 may calculate the distance from the autonomous vehicle 309 to the nearest edge of the mobility area on the roadway and may adjust driving parameters based on probabilities that one or more particular actions may cause an accident. Autonomous vehicle 309 may adjust driving parameters of the vehicle as the vehicle approaches the mobility and may take the safest action based on the expected movements of the surrounding BCI device users and other pedestrians that are not equipped with a BCI device 301. For example, as the autonomous vehicles 309 reaches the edge of the mobility area where one or more pedestrians are crossing the street, autonomous vehicle 309 may come to a complete stop outside of the mobility area and wait until the mobility area is clear and/or no additional pedestrians publish, via their brainwave signal data, that they intend to cross the roadway. Embodiments of the data processing engine 333 may identify the amount of time it takes for the mobility area to become clear and devoid of BCI device users and/or pedestrians no longer intending to cross the roadway, and upon the mobility area becoming clear, the autonomous vehicle 309 may start moving again from the stopped position or may wait an additional amount of time for pedestrians to finish crossing the roadway.

Embodiments of the action selection engine 335 may perform tasks, functions and/or processes associated with selecting driving actions of the autonomous vehicle 309 and adjusting the driving parameters of the autonomous vehicle based on the actions being selected. Using the information provided by the data processing engine 333, the action selection engine 335 may select a driving action from a list of available actions that may be considered suitable for the surrounding roadway environment, taking into account the intended actions of nearby pedestrians and BCI device users, and adjust the driving parameters of the vehicle based on the actions being selected. Driving actions that may be selected and implemented by the autonomous vehicle 309 from the action selection engine 335 can include driving actions such as speeding up the vehicle, slowing down the vehicle, stopping the vehicle, changing lanes, altering the driving route, etc. Available actions selectable within the action selection engine 335 may include any type of driving action that may be known or capable of being implemented by an automobile or other type of vehicle. For example, as an autonomous vehicle approaches a busy mobility area comprising one or more BCI users or pedestrians intending to cross the roadway, the autonomous vehicle may choose to stop the vehicle and select a "stop the vehicle" action within the action selection engine 335 resulting in the autonomous vehicle 309 to adjust driving parameters in a manner that decreases the vehicle speed by applying the brakes as the autonomous vehicle approaches the mobility area. In another example, the autonomous vehicle may approach a mobility area wherein publication data from a BCI device indicates a user may be traveling fast on a bicycle, and that based on the current speed of the BCI device, the pedestrian will cross the roadway prior to the autonomous vehicle reaching the edge of the mobility area if the autonomous vehicle 309 reduces speed. Accordingly, the autonomous vehicle can select a "reduce speed" action from the action selection engine 335 and implement driving parameters that decrease the speed of the vehicle to a threshold rate of speed calculated by the data processing engine 333 to cause the vehicle to reach the edge of the mobility area as the BCI device user finishes crossing the roadway, thus allowing the autonomous vehicle 309 to continue traveling without having to come to a complete stop.

Action reporting module 337 may operate in conjunction with the action selection engine 335 to communicate one or more driving actions selected by the autonomous vehicle 309 to the nearby BCI devices 301 and/or smart roadway infrastructure, including nearby traffic signals 311 and roadside broadcast systems 305. Action reporting module 337 may output alerts, notifications, images, animations and/or visual elements to nearby users of the BCI device 301 indicating one or more upcoming driving actions of the action selection engine 335 selected by the autonomous vehicle 309. Action reporting module 337 may transmit the outputted communications from the driving module 211 directly to nearby BCI devices 301 and/or nearby smart roadway infrastructure, including traffic signals 311 and other traffic controlling hardware in some embodiments. In alternative embodiments, smart roadways may be equipped with roadside broadcast systems 305 and instead of the action reporting module 337 communicating with each of the surrounding BCI devices 301 and/or smart roadside infrastructure, the action reporting module 337 may communicate selected driving actions of the autonomous vehicle with nearby roadside broadcast systems 305 and the roadside broadcast systems may relay the driving actions to nearby BCI devices 301, traffic signals 311 or other smart roadway infrastructure, other autonomous vehicles 309 that may be within the broadcasting range of the roadside broadcast system 305.

In some embodiments of the action reporting module 337, the action reporting module 337 may generate and render images, video, and augmented reality content depicting the intended driving actions of the autonomous vehicle 309 for display by BCI devices 301 within range of the autonomous vehicle 309, wherein upon receipt of the images, video and/or visual elements of the AR content the BCI device 301 may display the content generated by the action reporting module 337 visually indicating the upcoming actions selected by the autonomous vehicle 309. In alternative embodiments, the BCI device 301 may receive an alert or notification from the action reporting module 337 describing the upcoming driving actions selected by the autonomous vehicle 309 and the BCI device 301 may generate and render images, video and/or AR content to display to the user of the BCI device 301 based on the alerts or notifications being received from autonomous vehicle 309. In yet another alternative embodiment, roadside broadcast system 305 may receive the alerts or notifications being pushed out by the action reporting module 337 and the broadcast module 207 may, based on the reported actions, generate render images, video and/or AR display content describing the autonomous vehicle's selected action and push the images, video, AR content and other visual elements generated and rendered by the broadcast module 207 to all of the nearby BCI devices 301 and autonomous vehicles 309, for display.

Embodiments of driving module 211 may further comprise a vehicle-to-vehicle communication module 339. The vehicle-to-vehicle communication module 339 may perform task, functions and/or processes of the autonomous vehicle 309 responsible for communicating selected driving actions to other nearby autonomous vehicles 309 as well as optimize, coordinate and negotiate selected actions taken by each of autonomous vehicles 309. The vehicle-to-vehicle communication module 339 can communicate the selected actions of nearby autonomous vehicles based on the intended actions of BCI device users and nearby pedestrians observed by the BCI device users and ensure that the autonomous vehicles 309 are selecting actions that are compatible with actions being taken by the other autonomous vehicles 309. For example, if a first autonomous vehicle selects a driving action that includes stopping to allow pedestrians within an upcoming mobility area to cross a roadway, then upon a second autonomous vehicle that may be traveling in the opposite direction receiving the communication via the vehicle-to-vehicle communication module 339, the second autonomous vehicle 309 may also stop at the edge of the mobility area and allow the pedestrians to cross the roadway. Similarly, if the second vehicle was intending not to stop at the upcoming mobility area, vehicle-to-vehicle communication module 339 may negotiate a change in a selected of the second vehicle, and in response to the vehicle-to-vehicle communication occurring, the second vehicle may revise its driving parameters by selecting and reporting a new driving action (such as stopping at the edge of the upcoming mobility area) consistent with the first autonomous vehicle's action.

Figure 4:
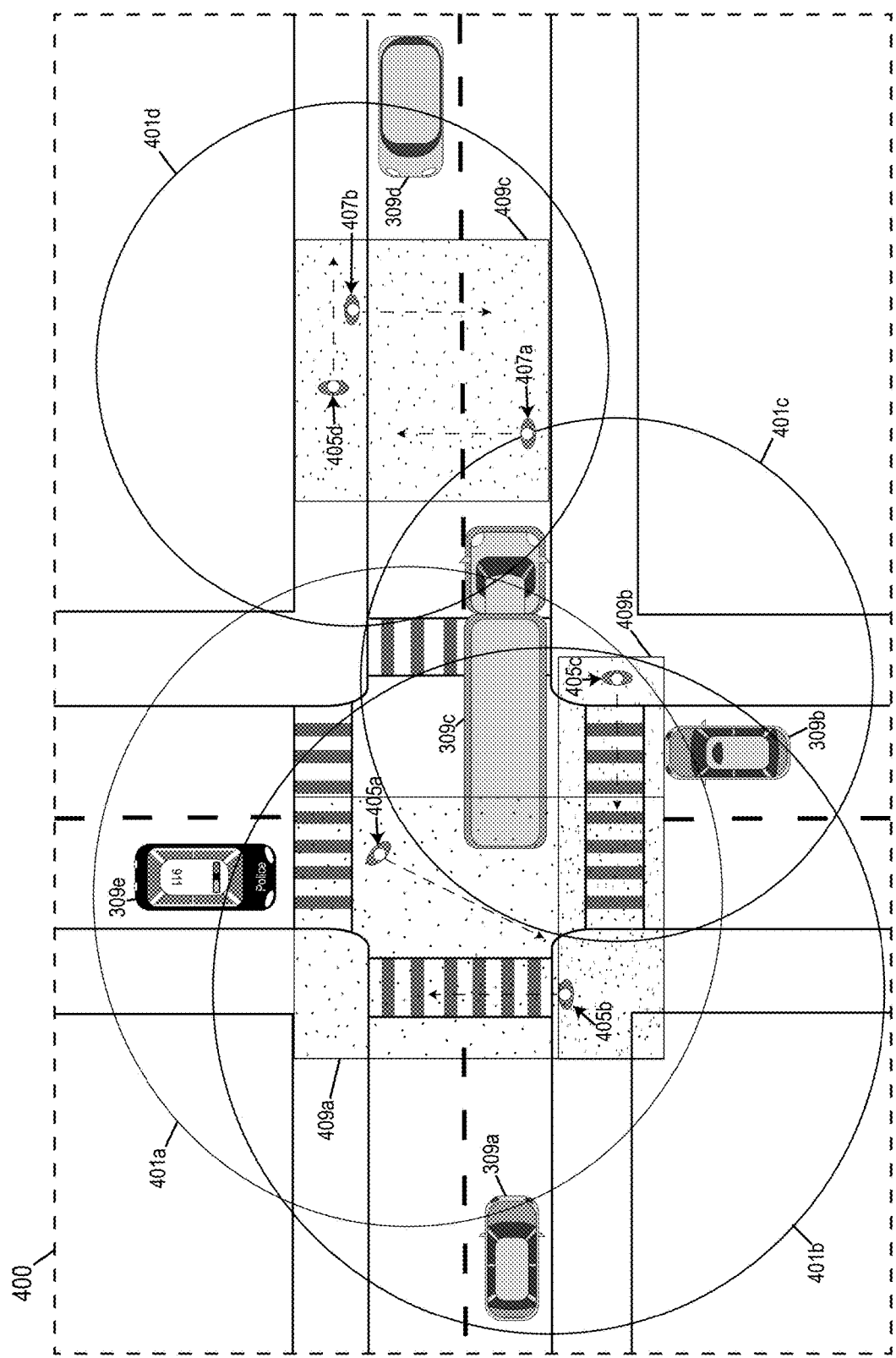
FIG. 4 illustrates a top-down view of an embodiment of a roadway environment comprising a section of traffic that includes one or more autonomous vehicles communicating with one or more BCI systems worn by pedestrians positioned within the environment, in accordance with the present disclosure.

Referring to the drawings, FIG. 4 illustrates a top-down view depicting an example of roadway environment 400. The roadway environment comprises a plurality of BCI device users 405a-405d communicating brainwave signal data along with other published data to nearby autonomous vehicles 309a-309e, which may influence driving actions implemented by the one or more of the autonomous vehicles 309a-309e. As shown in FIG. 4, the example depicts three different mobility areas 409a-409c. Mobility area 409a includes the presence of two BCI device users 405a-405b broadcasting published data describing the intent of the BCI device users to cross the roadway, their direction of their movement, speed, etc. The BCI devices 301 equipped by BCI device users may have a broadcasting range defined by broadcast boundaries 401a, 401b corresponding to BCI device users 405a and 405b. As depicted by the figure, published data being broadcasted by BCI device users 405a, 405b reaches autonomous vehicles entering or within the broadcast boundaries. In this example, autonomous vehicles 309a, 309b, 309c, and 309e are within broadcast boundaries of 401a and 401b. Furthermore, as autonomous vehicles 309a, 309b, 309c, and 309e approach the edge of mobility area 409a and autonomous vehicles 309a, 309b, 309c, and 309e may select one or more driving actions in response to the intended movements and locations of BCI device users 405a, 405b. As shown, Autonomous vehicles 309a, 309b and 309e stop and allow BCI device users 405a-40b to cross the roadway, while autonomous vehicle 309c may pass through the mobility area 409a at a speed predicted to avoid intersecting with BCI device user 405a and 405b. Autonomous vehicles 309a, 309b, 309c, and 309e may communicate their driving actions to BCI device users 405a, 405b.

Second mobility area 409b may overlap with mobility area 409a, or in some embodiments, mobility areas 409a and 409b may be combined into a single mobility area. In the embodiment depicted, BCI device user 405c may be communicating with different sets of autonomous vehicles 309 that other BCI user devices, positioned nearby. For instance, as shown in the instantaneous moment shown in FIG. 4, a BCI device 301 belonging to BCI device user 405c may establish a broadcast boundary 401c and the autonomous vehicles entering broadcast boundary 401c and thus receiving published data about BCI device user 405c may be autonomous vehicles 309b and 309c. However, as autonomous vehicles 309a, 309e or other vehicles depicted in the traffic environment enter broadcast boundary 401c, the autonomous vehicles may receive published data about BCI device user 405c and make one or more driving decisions accordingly. In the current example of FIG. 4, autonomous vehicle 309c enters broadcast boundary 401c, however since autonomous vehicle 309c is moving in a direction that does not intersect with the movement pathway of BCI device user 405c nor does autonomous vehicle 309c encroach upon the edge of mobility area 409b, autonomous vehicle 309c continues navigating the roadway consistent with the current driving parameters. In contrast, autonomous vehicle 309b intersects with the intended direction of movement of BCI device user 405c, and as autonomous vehicle 309b approaches the edge of mobility area 409b, the autonomous vehicle 309b slows or stops to allow BCI device user 405c to cross the roadway in the direction indicated by the arrow projecting from BCI device user 405c and may communicate the selected driving action to BCI device user's 405c BCI device.

A third mobility area 409c exhibits an example situation that includes a combination of both a BCI device user 405d and non-BCI equipped pedestrians 407a, 407b intending to cross a roadway in the directions indicated by corresponding arrows. BCI device user 405d may observe pedestrian 407a and/or pedestrian 407b and the BCI device 301 corresponding to BCI device user 405d may collect, track and publish brainwave signal data about not only BIC device user 405d's intent to cross the roadway (or not), but also the predicted intent(s) of both pedestrian 407a and/or 407b to cross the roadway and predicted movements as shown by the arrows projected from pedestrian 407a, 407b. The BCI device 301 corresponding to BCI device user 405d may publish data within broadcast boundary 401d to nearby autonomous vehicles 309c and 309d. The autonomous vehicles 309c, 309d entering the broadcast boundary 401d, may not only receive published data regarding the intent of BCI device user 405d as the vehicles approach mobility area 409c, but may also make one or more driving decisions as the autonomous vehicles 309c, 309d based on predicted movements of pedestrians 407a, 407b as the autonomous vehicles 309c, 309d approach the edge of mobility area 409c as shown. Although only BCI device user 405d may be able to receive responding communications from the nearby autonomous vehicles 309c, 309d indicating the autonomous vehicles' intended driving actions ahead of the driving action being performed, the intended movements of the pedestrians 407a, 407b unable to receive the communications from the autonomous vehicles 309c, 309d may still be considered by the vehicles as driving actions are selected.

Figure 5:
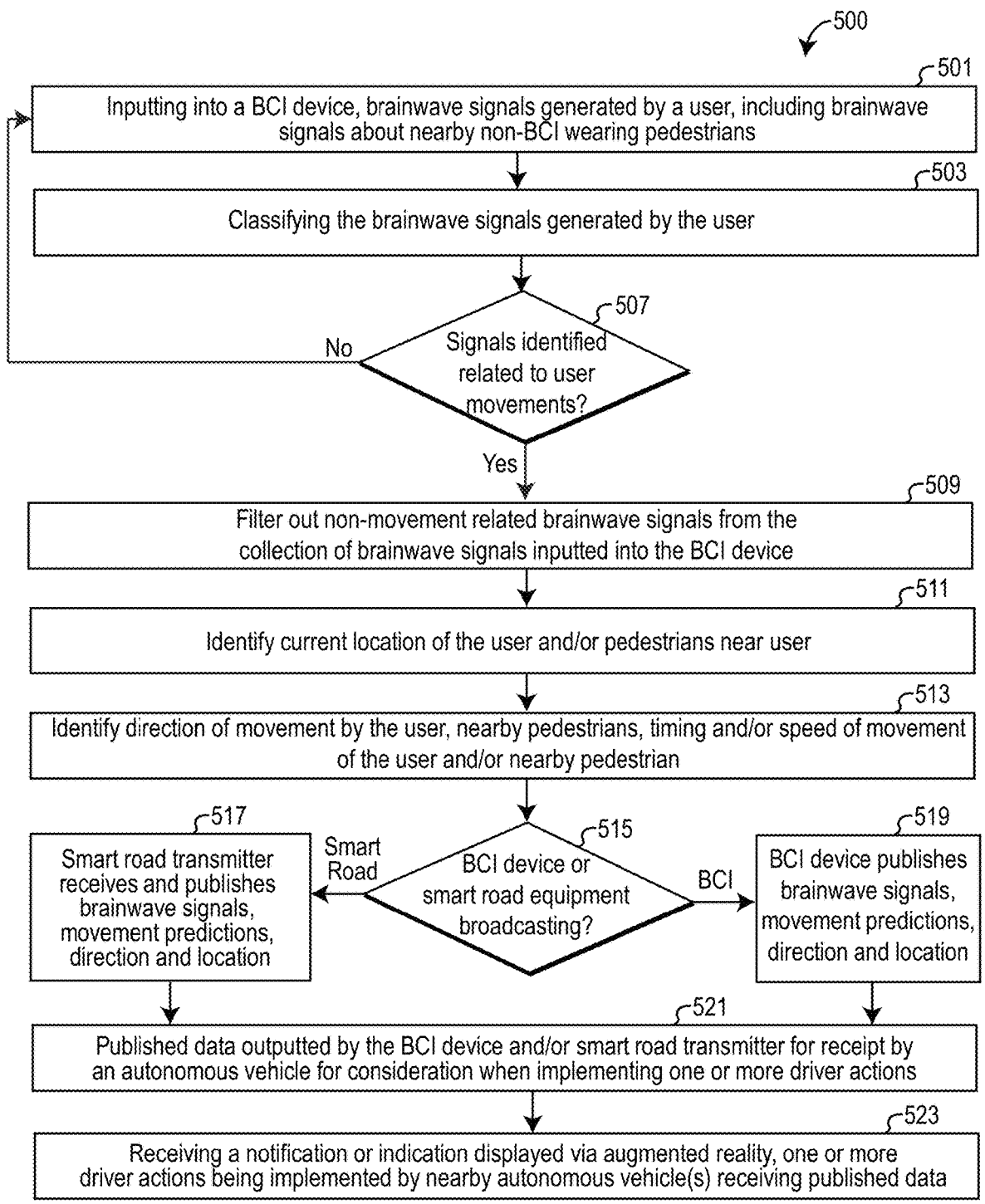
FIG. 5 depicts a flow diagram describing an embodiment of a computer-implemented method for enabling communication between an autonomous vehicle and a nearby pedestrian using a brain-computer interface, in accordance with the present disclosure.
Figure 6:
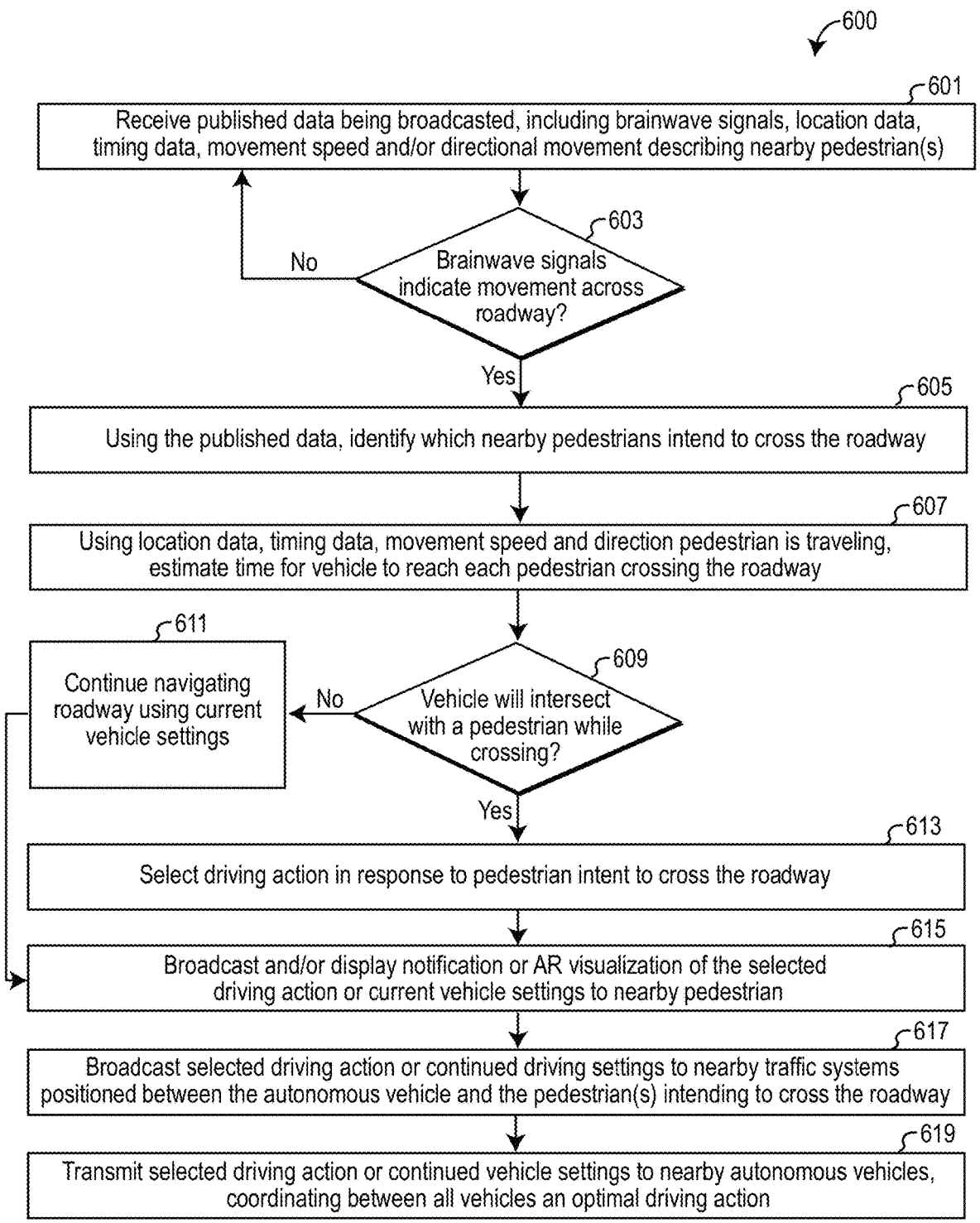
FIG. 6 depicts a flow diagram depicting an embodiment of a computer-implemented method for improving autonomous vehicle operation using signals outputted by brain-computer interface system of nearby pedestrians, in accordance with the present disclosure.

Method for Improving Autonomous Vehicle Operation Using Signals Outputted by Brain-Computer Interface System of Nearby Pedestrians The drawings of FIGS. 5-6 represent embodiments of methods 500, 600 for enabling communication between pedestrians and autonomous vehicles 309 using BCI devices 301, improving autonomous vehicle operation using the published data outputted by BCI device 301, in accordance with the computing systems and examples depicted in FIGS. 1-4 above. A person skilled in the art should recognize that the steps of the methods 500, 600 described in FIGS. 5-6 may be performed in a different order than presented and may not require all the steps described herein to be performed.

The embodiment of method 500 described by FIG. 5 may begin at step 501. During step 501 brainwave signals are inputted into the BCI device 301. Signal receiver 321 acquires brainwave signals from a user (i.e., a pedestrian) of the BCI device 301. Brainwave signals being generated by the user and collected by the signal receiver 321, may include brainwave signals about the user themselves, including signals related to the user's movements along or near a roadway, decisions about crossing the road and/or emotions of the user in relation to movements near the roadway. Moreover, brainwave signals being collected from the user may further include brainwave signals relating to observations by the user about nearby pedestrians who may or may not be wearing their own BCI device 301. A portion of brainwave signals being generated by the user, may include brainwave signals describing predicted movements about the nearby pedestrian being observed by the user. For example, the user's brainwave signals may indicate whether or not the user is expecting the nearby pedestrian to cross the roadway or stop and wait for vehicles to pass by. Signal receiver 321 may further amplify the raw brainwave signals, filter electrical noise or other interference, and digitize the brainwave signals for further processing by an AI module 323.

In step 503, an AI module 323 of the BCI device 301 may classify the inputted brainwave signals (or digitized versions thereof) being collected by the signal receiver 321. For example, in some embodiments AI module 323 may use a knowledge corpus comprising historical learning data about brainwave signals received from the user or plurality of users in order to classify which type of brainwave signals are directed movements of the user and/or nearby pedestrians and other non-movement-related brainwave signals. For instance, by identifying brainwave signals understood by the AI module 323 to indicate a user's intent to cross a roadway and/or stop at the roadway instead of crossing. In step 507, AI module 323 may determine whether the brainwave signals collected from the user of the BCI device 301 have been identified as being movement related for either the user themselves and/or nearby pedestrians observed by the user. If in step 507, a determination is made by the AI module 323 that the brainwave signals collected by the signal receiver 321 do not include any signals related to movement of the user and/or nearby pedestrians, the method 500 may return back to step 501, wherein the BCI device 301 continues acquiring brainwave signals from the user and AI module 323 continues classifying the signals being received. Conversely, if in step 507 the AI module 323 identifies brainwave signals as related to movement of the user and/or predicted movements of one or more nearby pedestrians that are observable by the user, method 500 may proceed to step 509.

In step 509 of method 500, AI module 323 of the BCI device 301 may filter out any brainwave signals received from the signal receiver 321 that are related to non-movement signals. As a result of the filtering process, only the brainwave signals related to the movement of the user and/or nearby pedestrians observed by the user will remain, preventing other non-movement related brainwave signals that are not useful to the autonomous vehicle(s) 309 from being broadcasted publicly. In step 511, location module 325 of the BCI device 301 may identify the current location of the user and/or nearby pedestrians being observed by the user and may further time stamp the location data with timing data. In step 513, location module 325 may further collect data identifying direction of movement of the user and/or nearby pedestrians and the rate of speed the user may be traveling.

In step 515, a determination may be made whether the BCI device 301 will be broadcasting the brainwave signal data, location data, timing data, movement data and/or rate of speed data directly to nearby autonomous vehicles 309 or whether smart road equipment, such as a roadside broadcast system 305 positioned near the roadways operating as a transceiver will be publishing the collected data to the surrounding environment. If the BCI device 301 is broadcasting the collected data, the method 500 may proceed to step 519, wherein publication module 329 publishes the brainwave signal data, location data, timing data, movement data (including movement predictions of nearby pedestrians) and the rate of speed data to nearby autonomous vehicles within a configured broadcasting range. Moreover, if during step 515 smart equipment such as the roadside broadcast system 305 positioned within a threshold distance of the user will be publishing the collected data, the method may proceed to step 517. During step 517, the transceiver of a broadcast module 207 may receive the data being published from the BCI device 301 and may publish the data to nearby autonomous vehicles 309 within a broadcast boundary by transmitting the brainwave signal data, location data, timing data, movement data and/or rate of speed data in a format that can be received and understood by the nearby autonomous vehicles within the broadcast boundary of the smart road equipment.

During step 521 of method 500, the published data is outputted to nearby autonomous vehicles 309 by the BCI device 301 and/or the roadside broadcast system 305 broadcasting the collected data, including the brainwave signal data, location data, timing data, movement data and/or rate of speed data. Upon receipt of the published data, the one or more autonomous vehicles 309 may process the incoming published data and select one or more actions in accordance with the method 600 described below. In step 523 BCI device 301 receives a notification (such as an alert, image, text, etc.), an indication via display by the AR display module 327 or other method for displaying information received by the autonomous vehicle 309. The incoming notification or indication being displayed may indicate one or more driver actions being implemented by the nearby autonomous vehicle 309 in response to receipt of the published data indicating intended movements of the user and/or nearby pedestrians observed by the user. The notification or indication provided to the BCI device 301 by the autonomous vehicle(s) 309 may include selected driver actions that may indicate the autonomous vehicle 309 may be slowing down, stopping, changing lanes, speeding up, etc. Users receiving the notification or displayed AR content, including one or more visual elements on the BCI device 301, or other AR-capable devices, may continue their movement as intended, such as continue to cross the road knowing the autonomous vehicle 309 intends to stop or slow down, or the user may modify the user's intended movements, knowing the action of the nearby autonomous vehicles ahead of the action being performed.

Method 600 further describes one or more steps taken by an autonomous vehicle 309 receiving published data being broadcasted by a BCI device 301 and/or a roadside broadcast system 305, then processing the incoming published data to make one or more driving actions that can modify the driving parameters of the autonomous vehicle 309. In step 601 of method 600, a published BCI data collector 331 of autonomous vehicle 309 receives the published data which may comprise the brainwave signal data, location data, timing data, movement data and/or rate of speed data describing nearby users of the BCI device 301 and/or pedestrians observed by the user of the BCI device 301. In step 603, a determination is made whether or not brainwave signal data received by the autonomous vehicle 309 include data indicating intended movement across a roadway or movements that may impact the current driving parameters of the autonomous vehicle 309, by either the user of the BCI device 301 and/or nearby pedestrians observed by the user. If in step 603 the brainwave signals predict intended movements across the roadway or movements that may intersect with the current traveling path of the autonomous vehicle 309, the method 600 may proceed to step 605.

During step 605 of method 600, a data processing engine 333 of the autonomous vehicle 309 may use the published data received from the BCI device 301, including location data and timing data to identify which nearby pedestrians intend to cross the roadway or move in a direction that could impact the current traveling path of the autonomous vehicle. Moreover, in step 607, the data processing engine 333 may further use the location data, timing data, movement speed and directional data of the pedestrian to identify the projected movement of the pedestrian and estimate an amount of time that may be necessary for the autonomous vehicle 309 to reach each pedestrian intending to cross the roadway or intersect with the autonomous vehicle 309. A mobility area comprising the movement paths of the pedestrians and BCI device users may be established. In step 609, a further determination is made with the vehicle is expected to intersect with the pedestrian while crossing the roadway or within the mobility area. If, based on the published data received by the autonomous vehicle 309, that the vehicle is not expected to intersect with the pedestrian crossing the roadway or while the pedestrian is within the mobility area, based on the current vehicle parameters being deployed, the method 600 may proceed to step 611 whereby the autonomous vehicle 309 continues navigating the roadway using the current vehicle parameters. Conversely, if upon processing the published data, the autonomous vehicle 309 does predict the vehicle will intersect with one or more pedestrians crossing the roadway or intersect with a mobility area while pedestrians are present within the mobility area, the method may proceed to step 613.

During step 613, autonomous vehicle 309 may select one or more driving action from the action selection engine 335 in response to the autonomous vehicle 309 knowing at least one pedestrian intends to cross the roadway or be within the mobility area as the autonomous vehicle approaches under the current driving parameters of the autonomous vehicle 309. In step 615, the autonomous vehicle broadcasts a notification, alert or other type of informational communication indicating the selected action of the autonomous vehicle 309 back to the BCI device 301 of one or more nearby pedestrians. In the exemplary embodiment, the selected action may include displaying to the pedestrian using an augmented reality device, a visualization of the action(s) being taken by the autonomous vehicle 309 in response to receiving the pedestrian's brainwave signal data. For example, displaying an animation comprising visual elements depicting the autonomous vehicle's driving path and maneuvers via an augmented reality display, such as by virtually showing the autonomous vehicle 309 slowing down, coming to a stop, changing lanes, etc. In step 617, the autonomous vehicle 309 may further broadcast the selected driving actions to nearby traffic signals 311 or other traffic systems positioned along the path between the autonomous vehicle and mobility area containing the pedestrian intending to cross the roadway, allowing the traffic signals 311 and other traffic controlling devices to respond and/or coordinate with the autonomous vehicle's action. Moreover, in step 619, the autonomous vehicle 309 may further transmit selected information about the driving actions being implemented by the vehicle to other nearby autonomous vehicles 309 on the roadway. By communicating vehicle-to-vehicle, the autonomous vehicle's intended driving actions being selected in response to knowing about the nearby pedestrian's intent to cross the roadway, all nearby autonomous vehicles 309 may optimize their own driving actions, prioritizing the safety of the pedestrians and coordinate their own driving parameters to maintain the flow of traffic along the roadway.

What is claimed is:

1. A computer-implemented method for enabling communication between an autonomous vehicle and a nearby pedestrian, the computer-implemented method comprising:
    receiving, by a processor of a brain-communication interface (BCI) device, brainwave signals generated by the nearby pedestrian, wherein the BCI device is adapted to receive brainwave signals from the nearby pedestrian and send the brainwave signals to the processor;

classifying, by the processor, the brainwave signals;

identifying, by the processor, the brainwave signals that are classified as relating to movement of the nearby pedestrian;

filtering, by the processor, the brainwave signals unrelated to the movement of the nearby pedestrian;

broadcasting the brainwave signals classified as relating to the movement of the nearby pedestrian to the autonomous vehicle; and in response to broadcasting the brainwave signals classified as relating to the movement of the nearby pedestrian, displaying, by the processor, one or more driver actions being implemented by the autonomous vehicle to the nearby pedestrian.

2. The computer-implemented method of claim 1, wherein the BCI device is a head-mounted cap, glasses or earbud.

3. The computer-implemented method of claim 1, wherein brainwave signals that are classified as relating to the movement of the nearby pedestrian indicate to the autonomous vehicle whether the nearby pedestrian intends to cross a roadway.

4. The computer-implemented method of claim 1, wherein the broadcasting of the brainwave signals further comprises:

transmitting, by the processor of the BCI device, the brainwave signals classified as relating to the movement of the nearby pedestrian, directly to any autonomous vehicles within a predetermined range of the nearby pedestrian or a smart road transmitter configured to broadcast the brainwave signals to the autonomous vehicles within a predetermined range of the nearby pedestrian.

5. The computer-implemented method of claim 4, wherein the broadcasting of the brainwave signals further comprises:

broadcasting, by the processor, location, speed of movement, and direction of movement, of the nearby pedestrian.

6. The computer-implemented method of claim 2, wherein displaying one or more driver actions being implemented by the autonomous vehicle comprises:

previewing to the nearby pedestrian, the one or more driver actions being implemented by the autonomous vehicle on an augmented reality device indicating how the autonomous vehicle will respond as the autonomous vehicle approaches the nearby pedestrian as the nearby pedestrian crosses the roadway.

7. The computer-implemented method of claim 1, wherein the brainwave signals being received by the BCI device from the nearby pedestrian further include a prediction of movement of a second nearby pedestrian; and broadcasting the brainwave signals classified as relating to the prediction of movement of the second nearby pedestrian to the autonomous vehicle.

8. A computer system for enabling communication between an autonomous vehicle and a nearby pedestrian, the system comprising:

a processor of a brain-communication interface (BCI) device, wherein the BCI device is adapted to receive brainwave signals from the nearby pedestrian and send the brainwave signals to the processor; and a computer-readable storage media coupled to the processor, wherein the computer-readable storage media contains program instructions executing, via the processor, a computer-implemented method comprising:

receiving, by the processor, brainwave signals generated by the nearby pedestrian;

classifying, by the processor, the brainwave signals;

identifying, by the processor, the brainwave signals that are classified as relating to movement of the nearby pedestrian;

filtering, by the processor, the brainwave signals unrelated to the movement of the nearby pedestrian;

broadcasting the brainwave signals classified as relating to the movement of the nearby pedestrian to the autonomous vehicle; and in response to broadcasting the brainwave signals classified as relating to the movement of the nearby pedestrian, displaying, by the processor, one or more driver actions being implemented by the autonomous vehicle to the nearby pedestrian.

9. The computer system of claim 8, wherein the BCI device is a head-mounted cap, glasses or earbud.

10. The computer system of claim 8, wherein brainwave signals that are classified as relating to the movement of the nearby pedestrian indicate to the autonomous vehicle whether the nearby pedestrian intends to cross a roadway.

11. The computer system of claim 8, wherein the broadcasting of the brainwave signals further comprises:

transmitting, by the processor of the BCI device, the brainwave signals classified as relating to the movement of the nearby pedestrian, directly to any autonomous vehicles within a predetermined range of the nearby pedestrian or a smart road transmitter configured to broadcast the brainwave signals to the autonomous vehicles within a predetermined range of the nearby pedestrian.

12. The computer system of claim 11, wherein the broadcasting of the brainwave signals further comprises:

broadcasting, by the processor, location, speed of movement, and direction of movement, of the nearby pedestrian.

13. The computer system of claim 9, wherein displaying one or more driver actions being implemented by the autonomous vehicle comprises:

previewing to the nearby pedestrian, the one or more driver actions being implemented by the autonomous vehicle on an augmented reality device indicating how the autonomous vehicle will respond as the autonomous vehicle approaches the nearby pedestrian as the nearby pedestrian crosses the roadway.

14. The computer system of claim 8, wherein the brainwave signals being received by the BCI device from the nearby pedestrian further include a prediction of movement of a second nearby pedestrian; and broadcasting the brainwave signals classified as relating to the prediction of movement of the second nearby pedestrian to the autonomous vehicle.

15. A computer program product for enabling communication between an autonomous vehicle and a nearby pedestrian, the computer program product comprising:

one or more computer readable storage media having computer-readable program instructions stored on the one or more computer readable storage media, said program instructions executes a computer-implemented method comprising:

receiving, by a processor of a brain-communication interface (BCI) device, brainwave signals generated by the nearby pedestrian, wherein the BCI device is adapted to receive brainwave signals from the nearby pedestrian and send the brainwave signals to the processor;

classifying, by the processor, the brainwave signals;

identifying, by the processor, the brainwave signals that are classified as relating to movement of the nearby pedestrian;

filtering, by the processor, the brainwave signals unrelated to the movement of the nearby pedestrian;

broadcasting the brainwave signals classified as relating to the movement of the nearby pedestrian to the autonomous vehicle; and in response to broadcasting the brainwave signals classified as relating to the movement of the nearby pedestrian, displaying, by the processor, one or more driver actions being implemented by the autonomous vehicle to the nearby pedestrian.

16. The computer program product of claim 15, wherein the BCI device is a head-mounted cap, glasses or earbud.

17. The computer program product of claim 15, wherein brainwave signals that are classified as relating to the movement of the nearby pedestrian indicate to the autonomous vehicle whether the nearby pedestrian intends to cross a roadway.

18. The computer program product of claim 15, wherein the broadcasting of the brainwave signals further comprises:

transmitting, by the processor of the BCI device, the brainwave signals classified as relating to the movement of the nearby pedestrian, directly to any autonomous vehicles within a predetermined range of the nearby pedestrian or a smart road transmitter configured to broadcast the brainwave signals to the autonomous vehicles within a predetermined range of the nearby pedestrian.

19. The computer program product of claim 16, wherein displaying one or more driver actions being implemented by the autonomous vehicle comprises:

previewing to the nearby pedestrian, the one or more driver actions being implemented by the autonomous vehicle on an augmented reality device indicating how the autonomous vehicle will respond as the autonomous vehicle approaches the nearby pedestrian as the nearby pedestrian crosses the roadway.

20. The computer program product of claim 15, wherein the brainwave signals being received by the BCI device from the nearby pedestrian further include a prediction of movement of a second nearby pedestrian; and broadcasting the brainwave signals classified as relating to the prediction of movement of the second nearby pedestrian to the autonomous vehicle.

\* \* \* \* \*